United States Patent [19]

Lopez

[11] Patent Number: 4,968,518

[45] Date of Patent: Nov. 6, 1990

[54] PROCESS FOR THE TREATMENT OF FRYING AND/OR COOKING OIL

[75] Inventor: Michael Lopez, Attleboro, Mass.

[73] Assignee: Klenz, Inc., Attleboro, Mass.

[21] Appl. No.: 394,057

[22] Filed: Aug. 14, 1989

[51] Int. Cl.$^5$ .................................................. 23L 1/03
[52] U.S. Cl. .................................. 426/330.6; 426/541; 210/DIG. 8
[58] Field of Search .................... 426/330.6, 542, 441, 426/541, 438, 271, 417; 210/DIG. 8

[56] References Cited

U.S. PATENT DOCUMENTS

| | | | |
|---|---|---|---|
| 2,457,741 | 12/1948 | Shipner | 426/542 |
| 2,648,608 | 8/1953 | Beadle | 426/541 |
| 2,768,084 | 10/1956 | Griffith | 426/541 |
| 2,895,964 | 7/1959 | Emerson | 426/541 |
| 3,732,111 | 5/1973 | Berner | 426/542 |
| 3,947,602 | 3/1976 | Clewell | 426/438 |
| 4,115,597 | 9/1978 | Pellar | 426/541 |
| 4,330,564 | 5/1982 | Friedman | 426/442 |
| 4,363,823 | 12/1982 | Kimura | 426/542 |

FOREIGN PATENT DOCUMENTS

| | | | |
|---|---|---|---|
| 737190 | 8/1968 | Belgium | 210/DIG. 8 |
| 47-19046 | 9/1972 | Japan | 426/330.6 |
| 2064297 | 6/1981 | United Kingdom | 426/542 |

*Primary Examiner*—Carolyn Paden
*Attorney, Agent, or Firm*—Oblon, Spivak, McClelland, Maier & Neustadt

[57] ABSTRACT

A process for recycling used cooking oil is disclosed. Used cooking oil is contacted with an aqueous solution containing ethylene diamine tetra acetic acid, n-propyl-3,4,5-trihydrobenzoate, mono-tert-butylhydroquinone, or a combination of these, to form a water/oil mixture. The water/oil mixture is then separated into its oil and aqueous components to obtain a regenerated oil.

11 Claims, 2 Drawing Sheets

4,968,518

PROCESS FOR THE TREATMENT OF FRYING AND/OR COOKING OIL

BACKGROUND OF THE INVENTION

1. Field of the Invention

The present invention relates to the treatment of frying and/or cooking oils.

2. Discussion of the Background:

All refined edible oils are made up of triglyceride molecules. Triglycerides have three fatty acids moieties attached via an ester linkage to each of three hydroxyl groups of a glycerin molecule. Between any two carbon atoms of the fatty acid moieties may be a double bond. Called points of unsaturation, double bonds are vulnerable to attack and breakdown.

Moisture from food being fried is the greatest cause of oxygen and mineral contaminants in frying oil. This moisture attacks points of unsaturation oxidatively breaking the fatty acid off from its triglyceride base. Metallic ions such as sodium, potassium and calcium react with this newly formed free fatty acid to form metallic soaps. Oil breakdown by oxygen attack also speeds the conversion of fatty acids to rancid off-flavors and off-odors.

As the concentration of soap in oil increases, these molecules begin to form water droplets called micelles that stay in the oil even at frying temperatures. Formation of micelles may be measured as a dramatic decrease in oxygen dissolved into the oil and indicates the beginning of rancidity.

The presence of soap in oil destroys the quality of a fried product. As food is immersed in contaminated oil, soap is drawn to its moisture-rich surface acting as wicks to pull oil inside the food product. Oil pickup by the food increases and the food interior becomes mushy while the exterior does not crisp.

In cooking and/or frying operations oil breakdown starts slowly and then dramatically accelerates. The slow initial conversion of fatty acids to metallic soaps is called the induction phase. This phase is slow as moisture must attack points of unsaturation in fatty acids before it passes from the oil.

The acceleration phase begins with the accumulation of metallic soaps above the minimum concentration required to support the formation of water micelles in the oil. The first off-flavors and off-odors associated with rancidity are apparent at this time.

New technology allows for the direct measurement of oxygen dissolved in edible oil for the first time. Previous tests offered only indirect measurement of oil quality with arbitrary and subjective guidelines. The results of direct measurement are independent of oil type and subjective judgment.

Oxygen content of oil declines as it breaks down into metallic soaps. Fresh oil holds oxygen in equilibrium with the atmosphere around it. As oil ages in the induction phase, oxygen content declines as moisture introduced by the food is retained. Upon the accumulation of soaps above a minimum concentration for micellular formation, the oxygen content declines dramatically.

Oxygen in these micelles attacks double bonds in the fatty acids to start oil breakdown. Anti-oxidants, which work by consuming oxygen before it can attack vulnerable fatty acids, could theoretically be used to address this problem.

Materials that function in this way naturally occur in the oil or can be added before the oil is used. However adding a greater concentration of anti-oxidant than occurs in the virgin oil can accelerate rather than delay oil breakdown. The addition of anti-oxidants after breakdown has proven ineffective.

Solid contaminants in the oil can also accelerate the induction phase of oil breakdown. Triglyceride molecules attach to the surface of a particle absorbing the heat it has collected. As each molecule is heated, a fatty acid may decompose, breaking off from the triglyceride.

Filtration slows oil breakdown by limiting the surface area available for attachment. However, oil will still breakdown in hours under the presence of moisture.

Silicates such as diatomaceous earth have been chemically altered to react with different breakdown products in the oil. Calcium silicate has been used to neutralize free fatty acids. This neutralization takes place because calcium silicate converts free fatty acids to metallic soaps. Soap makers have been adding similar materials to their processes to convert a greater percentage of oil to soap.

Another man-made material, magnesium silicate, has been used to bleach broken down oil. Color conversion does not correlate with oil performance. The application of magnesium silicate in the presence of oxygen may accelerate oil break down.

U.S. Pat. No. 3,947,602 discloses a process for increasing the useful life of cooking oil by treating the cooking oil with a food compatible acid. This treatment is reported to counteract the adverse effect of food juices dissolved in the cooking oil. The food compatible acids disclosed are citric acid, tartaric acid, acidic acid, phosphoric acid, and maleic acid.

In this process, the cooking oil is added to an aqueous solution containing the food compatible acid. U.S. Pat. No. 3,947,602's choice of acids however provides water/oil layer separation problems due to a formation of emulsions, and inadequately regenerates the oil. U.S. Pat. No. 3,947,602 also recommends using citric acid which is partially soluble in oil and consequently contaminates the regenerated oil.

U.S. Pat. No. 4,330,564, granted to one of the inventors of U.S. Pat. No. 3,947,602 proposes a solution to the problems inherent in the U.S. Pat. No. 3,947,602 process. The solution comprises immobilizing the food compatible acid on a porous rhyolite carrier. This solution however is also unsatisfactory. The use of a rhyolitic carrier requires the inconvenient use of a filter cake with filter machine to remove the rhyolite carrier supported food compatible acid from the treated oil.

Accordingly there is a strongly felt need for a process which would overcome these disadvantages and which would provide for the facile and efficient removal of undesirable impurities from cooking oil restoring the cooking oil's desirable cooking properties.

SUMMARY OF THE INVENTION

Accordingly, it is an object of this invention to provide a novel process for the treatment of oil, which process is facile to operate.

It is another object of this invention to provide a facile process for the treatment of oil which provides a very high quality treated oil.

It is another object of this invention to provide a process for the treatment of cooking oil which does not result in the contamination of the cooking oil by the treatment material.

It is another object of this invention to provide a novel fried food product, produced on a commercial scale, in which the food product has absorbed very low amounts of the oil in which it is fried.

The inventor has now discovered a process, and an apparatus for practicing this process, which satisfy all of these objects of this invention and other objects which will become apparent from the description of the invention given hereinbelow.

The present process comprises contacting at least a portion of used cooking oil with an aqueous solution containing a regeneration agent. The regeneration agent is at least one member selected from the group consisting of ethylenediaminetetraacetic acid, n-propyl-3,4,5-trihydrobenzoate and mono-tertbutylhydroquinone. This agent is present in the aqueous solution in an amount of from 20 ppm to saturation. The treated oil is added to and then separated from the aqueous solution and is ready for use in cooking operations.

The process of the present invention, when used in conjunction with frying and/or cooking operations, provides a higher quality fried and/or cooked product. The oil is recycled before the oil degradation product have caused the oil to soak into the food.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
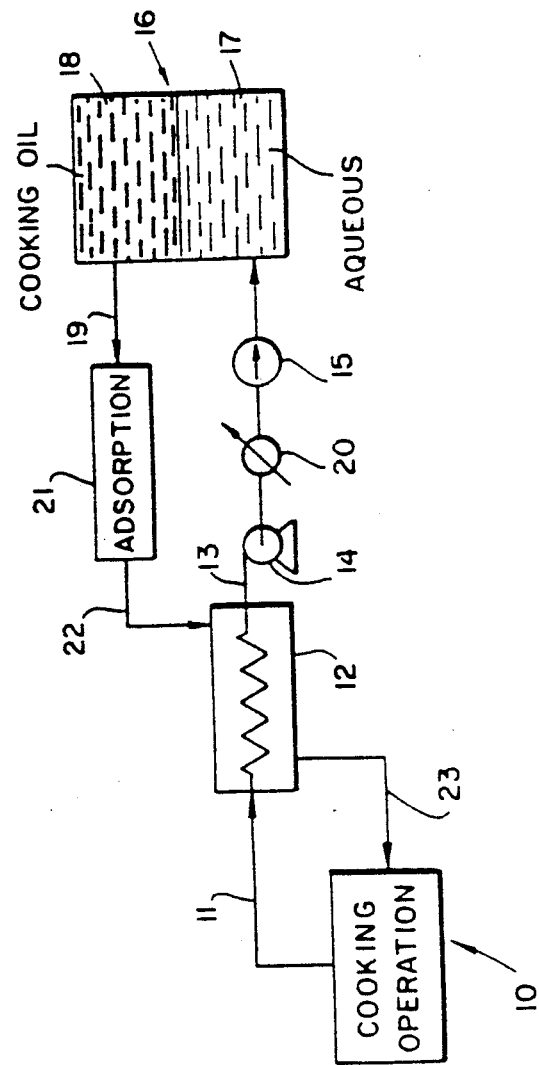
FIGS. 1 and 2 illustrate two different simplified schematic flow diagrams of apparatus for the continuous or batch-wise operation for the treatment of cooking oil in accordance with the present invention.

Referring to FIG. 1, a cooking operation which uses a cooking oil is schematically indicated as 10. For example, such a cooking operation could be one or more friers which use cooking oil for the cooking, for example, of vegetables, such as onions, potatoes etc., meats, fish or fowl.

Cooking oil which is to be treated is withdrawn from cooker 10 through line 11 and passed through a heat exchanger 12 where the cooking oil is cooled by indirect heat transfer with treated cooking oil being returned to cooker 10. The cooled cooking oil in line 13, which includes pump 14 and check valve 15, is introduced into an extraction vessel schematically illustrated as 16. A cooler 20 may be optionally employed in the event further cooling of the cooking oil is required to prevent boiling of the treating solution.

The extraction vessel includes a body of treating liquid, schematically indicated as 17. The treating solution is comprised of a solution of a regeneration agent. The cooling oil is preferably introduced into the treating liquid 17 in a dispersed state to increase the contact surface between the cooking oil and the treating solution. For example, the cooking oil can be bubbled into the treating solution.

The cooking oil introduced into vessel 16 rises through the treating solution 17 whereby the cooking oil is contacted with the treating solution the oil is regenerated. As a result of the density difference between the cooking oil and treating solution, the regenerated cooking oil forms a separate phase, schematically indicated as 18, above the treating solution.

Recycled (regenerated) oil is withdrawn from extraction vessel 16 through line 19 and may optionally be passed through an adsorption zone 21, including a suitable adsorbent, such as activated carbon, to remove soluble oxidized and pyrolyzed contaminants from the oil. In the adsorption zone, some or all of the insoluble components may be separated from the cooking oil by filtration through the adsorption media. If required, a separate filter could be provided for separating insoluble components from the cooking oil.

In accordance with a preferred embodiment, the adsorption zone 21 is provided with means for heating the oil to prevent its solidification during periods when the cooking oil is to be treated, and the fryer is not in operation. Thus, for example, during nonworking hours, the cooking oil from the cooking operation can be passed through the treating operation with the heating means activated to maintain the cooling oil fluid. It is also to be understood that such a heating means need not be provided in the adsorption zone and that the heating means could be employed as a separate piece of equipment.

The cooking oil withdrawn from zone 21, through line 22, is passed through heat exchanger 12 where the cooking oil is heated by indirect heat transfer with the cooking oil withdrawn from cooker 10. The heated cooking oil from heat exchanger 12 is recycled to cooker 10 through line 23.

It is to be understood that the body of treating liquid 17 in vessel 16 must be periodically replaced to maintain its effectiveness.

It is also to be understood that it is not necessary to treat the cooking oil at the rate at which undesirable products are formed therein. Accordingly, cooking oil can be continuously or periodically withdrawn from the cooker for treatment, as hereinabove indicated. If possible all or a portion of the treatment cycle can be effected when the cooker is not in operation.

It is further to be understood that although the process for treating cooking oil in accordance with the present invention has been hereinabove described with respect to a continuous operation, such treatment can be effected as a batch operation.

The present invention is particularly advantageous in that the useful life of a cooking oil is greatly increased and in this manner, overall costs are reduced. The process of this invention also provides a higher quality final product in industrial cooking operations by providing a higher quality cooking oil throughout the cooking operation. The fried product obtained contains a lower amount of absorbed oil.

Figure 2:
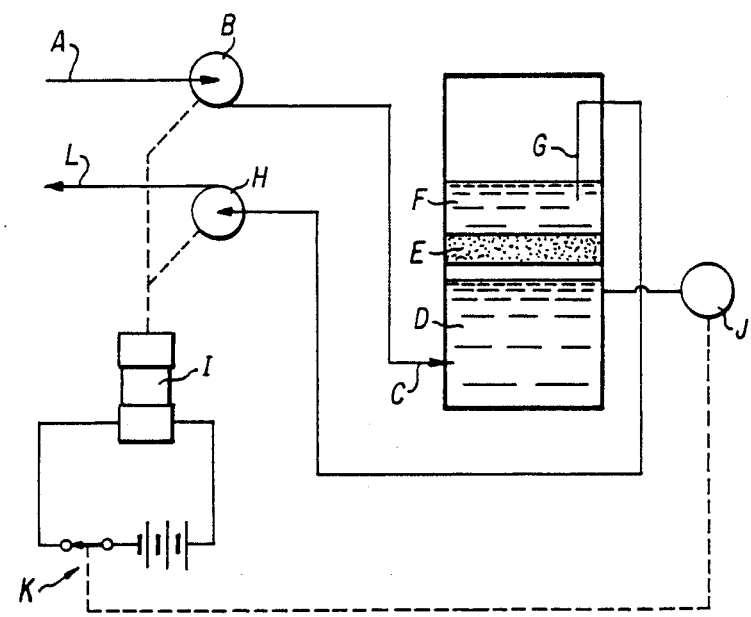

Referring to FIG. 2, wherein like reference letters designate identical or corresponding parts, and which provides another embodiment of this invention, cooking oil to be treated is withdrawn from a cooking operation via line A, by means of a pump B, and is introduced into the regeneration agent-containing aqueous solution contained in the extraction vessel. Oil inlet means C may be designed advantageously to allow the oil to be dispersed (or bubble) through the aqueous solution containing the regeneration agent. In a preferred embodiment the cooking oil is thus introduced into the treating liquid in a dispersed state to increase the contact surface between the cooking oil and the treating solution and thereby increase regeneration efficiency.

The cooking oil introduced into the vessel rises up through treating solution D to the top of the treating solution where an optional solids filter E may b situated.

The regeneration agents used in this invention provide for the formation of only small quantities of emulsion permitting the regenerated oil to rapidly rise through solution D and filter E to level F where it is withdrawn from the extraction vessel via line G by means of pump H, and recycled to the cooking operation via line L.

A salient advantage of the process of the present invention is that, in contrast to processes which employ citric acid, tartaric acid, acetic acid, phosphoric acid, or maleic acid (see, e.g. U.S. Pat. No. 3,947,602), the regeneration agent used in the present invention provides for the formation of only small quantities of emulsion. This greatly facilitates the efficiency of the oil regeneration operation. Further the regeneration agents used in the present invention are insoluble in the regenerated oil, eliminating the disadvantage of contamination of the regenerated oil by the regeneration agent as is found with prior art processes.

FIG. 2 further illustrates an optional motor I which may be used to run both pump means B and H, a level switch J, a circuit to shut off motor I if the fluid level in the vessel rises above a predetermined level as determined by level switch J.

The process of the present invention requires two basic operations. In the first operation, at least a portion of used cooking oil is contacted with an aqueous solution containing a regeneration agent. The regeneration agent used in the present invention is ethylene diamine tetra acetic acid, n-propyl-3,4,5-trihydrobenzoate, mono-tert-butylhydroquinone, or a mixture of these. These agents are present in the aqueous solution in an amount of at least 20 ppm to saturation. This aqueous solution however can also be supersaturated with the regeneration agent, and in a preferred embodiment, an amount of regeneration agent in excess of that capable of being dissolved in the aqueous solution is present in the bottom of the aqueous solution to maintain a saturation level of the regeneration agent in the aqueous solution. In the second operational step of the present process, the water/oil mixture is separated into its aqueous and oil components, with the oil component recovered being regenerated and ready for use in a cooking/frying operation.

The cooking oil is contacted with the aqueous solution at a temperature which is sufficiently high to prevent the solidification of the cooking oil. Any temperature higher than that temperature may be used, up to the boiling point of the used cooking oil. Preferably however the temperature does not exceed the boiling point of the aqueous solution.

The regeneration agent used in the present invention is either ethylenediamine tetraacetic acid (in its acid form), n-propyl-3,4,5-trihydrobenzoate or mono-tert-butylhydroquinone (TBHQ). All of these materials are readily commercially available.

TBHQ is the common name for mono-tertiary-butylhydroquinone, a material of the formula:

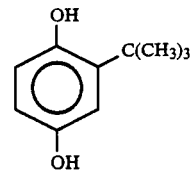

TBHQ was approved for use in the preservation of foodstuffs by the United States Food and Drug Administration in 1972. Its extent of allowable uses was expanded to meat products by the U.S. Department of Agriculture in 1979.

The compound is most effective in the prevention of oxidation in vegetable oils, thus precluding the foul aroma and acrid taste produced by the resulting rancidity. The material is color stable.

The primary application for TBHQ is in the preservation of shortenings and oils derived from vegetables such as cottonseed, soybeans, and safflower.

| Characteristics | |
|---|---|
| Appearance: | White to Light Tan Crystals |
| Empirical Formula: | $C_{10}H_{14}O_2$ |
| Mol. Wt. | 166.2 |
| Melting Point: | 126.5–128.5° C. |
| Boiling Point: | 295° C. |
| Solubility, g/100 g solvent @ 20° C.: | |
| Benzene | Insoluble |
| Methanol | 100 |
| Propylene Glycol | 30 |
| Corn Oil | 10 |
| Lard (50° C.) | 5 |
| Water | Nil |
| Bulk Density: | 27 lb/cu.ft. |
| Purity: | 99.0 Min. |

Propyl gallate is the common name for the antioxident n-propyl-3,4,5-trihydroxybenzoate. It is used for the preservation of fats and oils and is approved for food use by the FDA in CFR 21 184.1660. This material has the formula:

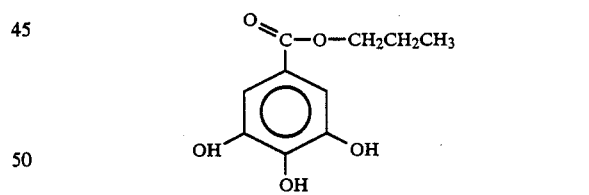

| Characteristics | |
|---|---|
| Appearance: | White crystalline powder with very slight odor |
| Empirical Formula: | $C_{10}H_{12}O_5$ |
| Mol. Wt. | 212 |
| Melting Point: | 146–148° C. |
| Boiling Point: | (Decomposes) |
| Solubility, g/100 g solvent @ 25° C.: | |
| Acetone | 121 |
| Water | 0.35 |
| Benzene | 0.16 |
| Ethanol | 103 |
| Lard (45° C.) | 1.14 |
| Methanol | 170 |
| Peanut Oil | 0.5 |
| Cottonseed Oil (30° C.) | 1.23 |

| Characteristics | |
|---|---|
| Ethyl Ether | 83 |
| Cod Liver Oil (2 hrs. 80° C.) | 1 |
| Hydrogenated Fish Oil (4 hrs. 85° C.) | 1.4 |
| Propylene Glycol | 67 |
| Hydrogenated Soy Oil (4 hrs. 855° C.) | 1.8 |

Frying as a method of food preparation is essentially identical across different foods and at different scales. Whether natural or processed, the molecular structure of fats and oils used as the heat transfer medium is remarkably consistent.

Typically, the medium is heated to its smoke point, approximately 305 degrees Farenheit, and food is immersed in it. After its exterior has been crisped the food is ready to be eaten. This process has changed little since the time of the Egyptian pharoahs.

The most significant contrast among fryers is between commercial and retail operators. Commercial operators tend to fry on a much greater scale than retailers. This scale justifies greater capital investment and more sophisticated process control. Retail operators see their fryer as one tool among many in a restaurant kitchen. Consumers have chosen to purchase fried food from commercial and retail processors rather than make the food themselves because of convenience and cost.

Commercial frying processes differ by choice between batch or continuous fryers and the degree of control. One of the largest potato chip producers in New England offers a common example of a continuous frying process. Each hour, nearly five thousand pounds of potatoes are chipped and drawn by conveyor through a vat filled with a thousand gallons of oil. The oil is continuously circulated from the vat through a gas-fired heat exchanger and pumped back into the vat. Under normal operating conditions, one hundred gallons of fresh oil is added each hour to make up for oil absorbed into the chips. This process is comparable to those for fried frozen products such as breaded chicken or fish.

Commercial operators have also successfully used batch fryers. Here one hundred pound batches of sliced potatoes are added to a vat filled with two hundred gallons of oil. As a batch finishes frying it is removed and the next batch is added. Fresh makeup oil is added as needed either manually or automatically. The oil is heated with gas-fired heater tubes that cross the bottom of the vat. This process is more common in less sophisticated operations like nut processing.

The retail processors operate on a much smaller scale. Most retail fry vats hold seven or fewer gallons of oil with the largest holding less than twenty-five gallons. Almost all operations are batch rather than continuous. Oil may be heated with electric resistance elements rather than natural gas. All other process variables such as frying temperature and cooking time are comparable to commercial operations.

By providing for the efficient regeneration of used cooking oil, the process of the present invention may be used in association with one of the industrial (i.e. commercial and retail) frying operations discussed above. In this embodiment, part of the cooking oil is continuously withdrawn from the cooking operation, recycled, and then returned to the cooking operation, thereby maintaining a high quality cooking oil in the operation.

In this embodiment, the process of the present invention provides a high quality fried product. The process of the present invention prevents the formation of soap in the cooking oil, avoiding the absorption of the used cooking oil into the fried product which results in a deteriorioation of the fried product.

The term "fried food article" used in this text refers to any well known food article which is fried on an industrial scale. Illustrative examples of these food articles include fried potato products, such as potato chips, fried chicken, fried fish or fried nuts.

The fried food articles produced on an industrial scale contemplated by the present invention are those food articles provided either using a continuous frying operation or a batch frying operation in which at least 100 pounds of an industrially produced fried food article is produced.

Other features of the invention will become apparent in the course of the following descriptions of exemplary embodiments which are given for illustration of the invention and are not intended to be limiting thereof.

I. Purpose

The experiments reported below compare the efficacy of various additives to break oil water emulsions. Efficacy was hypothetically determined prior to experimentation.

II. Description of Experiment degraded partially-hydrogenated vegetable oil water for the following solutions
Control: no water
Diammonium EDTA (NTA)
Tetra-Sodium EDTA
Citric Acid
EDTA Acid Protocol (1) heat degraded oil to 300° F.
(2) prepare aqueous solutions (2 grams chemical to 500 ml H$_2$O at amb. temperature)
(3) add 200 ml hot oil to each aqueous solution
(4) agitate each mixture in mechanical blender for 60 sec.
(5) allow blended mixture to settle for 60 sec.
(6) record visual observations of oil/water phase separation.

III. Discussion

Oil

The oil under test was an all-vegetable blend commonly used for retail frying. Breaded chicken and potatoes had been fried in the oil. It was dark brown, opaque and smelled rancid. All solid contaminants to 100 microns had been filtered prior to experimentation.

The oil was heated to its smoke point of approximately 300° F. in a stainless steel container. A 200 ml was taken as needed for each run.

Aqueous Solutions

Five liters of water was collected for the experiment. For each run, 500 ml of water was removed. Two grams of each chemical was weighed out and added to the water. The solution was vigorously agitated. Only the EDTA acid did not completely dissolve. This was expected as EDTA acid is soluble only up to 0.03% in water. All additives were manufactured by W. R. Grace and were pharmaceutical grade.

Run

The hot oil was added to the aqueous solution. The mixture was vigorously agitated in a mechanical blender for one minute. The solution was then allowed to settle for one minute. The condition of each solution wa then described.

IV. Results:

The visual observations for each run have been tabulated below.

| Run | Additive | Description |
|-----|----------|-------------|
| 1 | no additive | brown emulsion |
| 2 | (Na)$_4$ EDTA | milky brown emulsion w/foamy head |
| 3 | (NH$_3$)$_2$ EDTA | water/emulsion/oil phases |
| 4 | Citric Acid | more distinct water/emul./oil phase |
| 5 | EDTA Acid | distinct oil and water phases |

Several observations are important to point out. (1) The addition of sodium EDTA formed a soap like emulsion. The container could be rinsed without a residue. The oil had been solubilized into the water phase. (2) The aqueous solution with citric acid showed slow phase separation. An emulsion phase remained even after a long settling period. (3) With EDTA acid the separation of oil and aqueous phases was immediate and distinct. The oil-water emulsion dissipated within fifteen seconds after agitation had been discontinued. Crystals of EDTA Acid remained at the oil-water interface. (4) In all runs, the color of the oil was not perceptibly affected.

Oil degradation produced soaps that allow oil and water to mix. Micelles of moisture form in the oil, even at elevated temperatures. The chemical reactions included under oil degradation accelerate with micellular formation.

The treatment of oil with an aqueous solution of EDTA acid caused a clean separation of oil and water. Micellular emulsification was reversed. In the same way, micellular activity in any cooking oil can be reversed.

Obviously, numerous modifications and variations of the present invention are possible in light of the above teachings. It is therefore to be understood that within the scope of the appended claims, the invention may be practiced otherwise than as specifically described herein.

WHAT IS NEW AND DESIRED TO BE SECURED BY LETTERS PATENT

1. A process for treating used cooking oil, comprising:
    (i) contacting at least a portion of said used cooking oil with an aqueous solution containing at least 20 ppm of a regeneration agent which is at least one member selected from the group consisting of ethylenediamine tetraacetic acid and n-propyl-3,4,5-trihydrobenzoate, to obtain a water/oil mixture; and
    (ii) separating the oil and the aqueous components of said water/oil mixture to obtain a regenerated oil.

2. The process of claim 1, comprising contacting said used cooking oil and said aqueous solution at a temperature within the temperature range of from the melting point of said used oil to the boiling point of said used cooking oil.

3. The process of claim 2, wherein said temperature range is from the melting point of said oil to the boiling point of said aqueous solution.

4. The process of claim 1, wherein said aqueous solution is in contact with a supply of additional unsolvated regeneration agent.

5. The process of claim 1, wherein said contacting comprises dispersing said used oil into said aqueous solution.

6. The process of claim 5, wherein said used oil is bubbled through said aqueous solution.

7. The process of claim 1, wherein said regeneration agent is ethylenediamine tetraacetic acid.

8. The process of claim 1, wherein said regeneration agent is n-propyl-3,4,5-trihydrobenzoate.

9. In a process for frying a food product in oil, the improvement comprising:
    (i) continuously withdrawing a portion of the oil used in the frying operation;
    (ii) contacting said portion of oil with an aqueous solution containing at least 20 ppm of a regeneration agent which is at least one member selected from the group consisting of ethylenediamine tetraacetic acid and n-propyl-3,4,5-trihydrobenzoate, to obtain a water/oil mixture;
    (iii) separating the oil and the aqueous components of said water/oil mixture to obtain a regenerated oil; and
    (iv) returning said regenerated oil to said frying operation.

10. The process of claim 9, wherein said regeneration agent is ethylenediamine tetraacetic acid.

11. The process of claim 9, wherein said regeneration agent is n-propyl-3,4,5-trihydrobenzoate.

* * * * *